G. W. STOCKMAN,
Assignor, by mesne assignments, of part interest to S. STEPHENS, C. A., F. A., & M. A. MAUS.
VAPOR OR GAS ABSORBER FOR AMMONIA REFRIGERATING APPARATUS.
No. 10,261. Reissued Dec. 19, 1882.
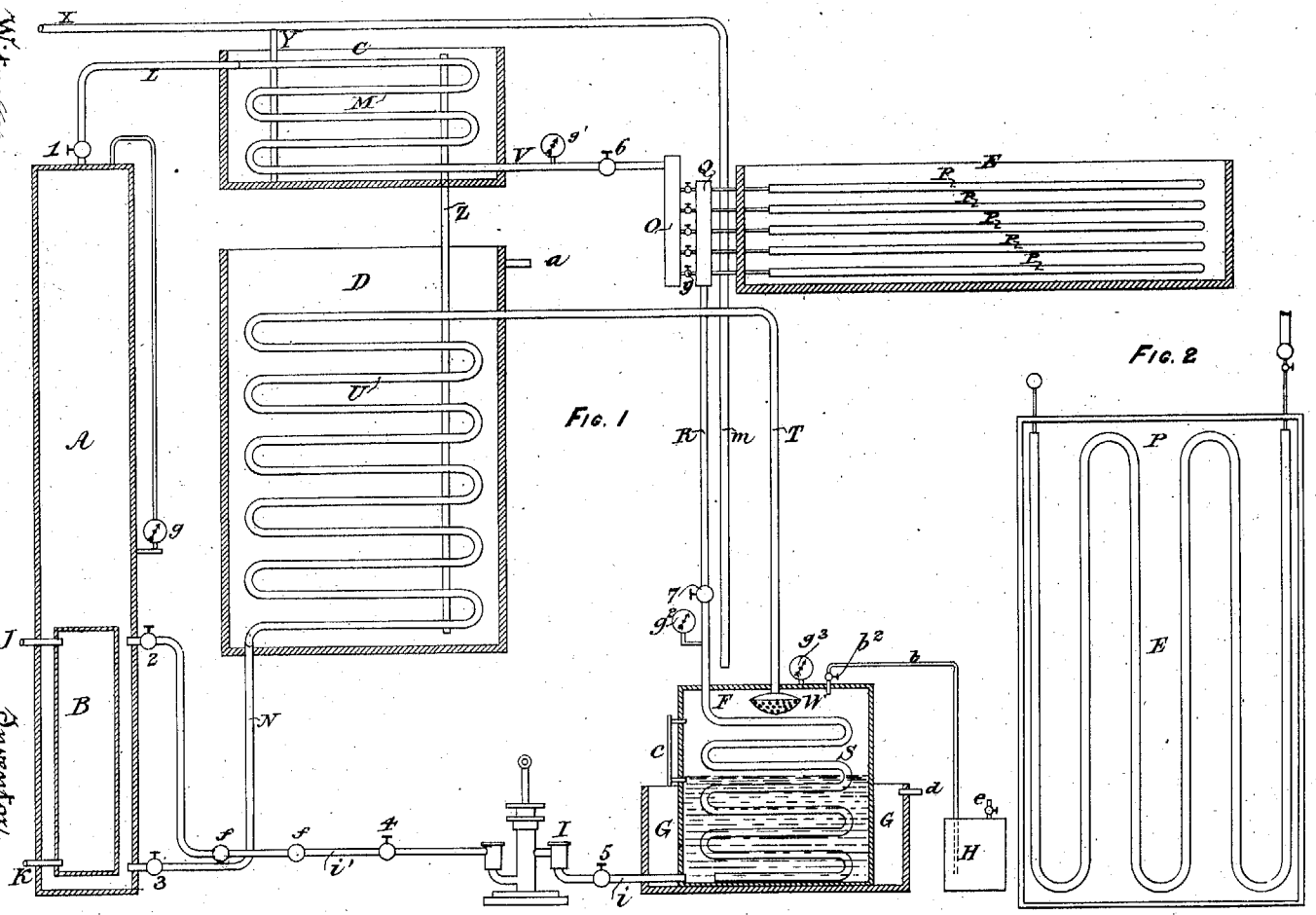
Witnesses
O. L. Pettibone
J. W. Walker.
Inventor
Geo. W. Stockman
by C. P. Jacobs
his attorney

UNITED STATES PATENT OFFICE.

GEORGE W. STOCKMAN, OF INDIANAPOLIS, INDIANA, ASSIGNOR, BY MESNE ASSIGNMENTS, OF PART INTEREST TO SAMUEL STEPHENS, C. ALBERT MAUS, FRANK A. MAUS, AND MATHIAS A. MAUS, ALL OF SAME PLACE.

VAPOR OR GAS ABSORBER FOR AMMONIA REFRIGERATING APPARATUS.

SPECIFICATION forming part of Reissued Letters Patent No. 10,261, dated December 19, 1882.

Original No. 245,325, dated August 9, 1881. Application for reissue filed April 15, 1882. Patented in England June 14, 1881, No. 2,587; in France August 30, 1881, No. 143,407; and in Germany March 15, 1882, No. 17,267.

*To all whom it may concern:*

Be it known that I, GEORGE W. STOCKMAN, of Indianapolis, Indiana, have invented an Improvement in Absorbers for Ammonia Refrigerators, of which the following is a description.

My object is to effect a continuous circulation of the ammonia in its vapory and liquid conditions by employing the weak or diluted liquid ammonia as an absorbing medium after it has been reduced in temperature by the use of a weak liquid cooler and the expanded vapor from a refrigerator.

In the drawings Figure 1 represents a vertical sectional view of my improved absorber and its connections with a retort, a vapor-condenser, a cooler, a refrigerator, and a pump. Fig. 2 is a top view of the refrigerator.

Similar letters represent like parts.

A represents a retort or evaporator with heater B. C is a vapor-condenser. D is a cooler for weak or diluted liquor, and E is a refrigerator, all of the ordinary kind.

F represents the shell of the absorber, which is surrounded by the water-jacket G.

H is the purge-tank, and I is a force-pump.

The heater B is provided with a steam-pipe, J, near its top, and pipe K at its base, for carrying off condensed steam. The vapor-pipe L leads from the top of the retort A to the condenser C. This pipe is provided with a valve, 1, near the retort, and forms the condensing-coil M in the condenser C and the liquid-ammonia pipe V. This latter pipe is provided with a valve, 6, and pressure-gage $g'$, and terminates in the upper end of the distributer O.

P P P P represent several independent coils of pipe in the refrigerator-box E, one end of each coil starting from the distributer O, with valves $y$, and discharging at the other end into the collector Q. This collector Q is provided at its base with a downward-projecting pipe, R, for the vapor to pass through into the absorber-coil S. The vapor-pipe R is provided with a valve, 7, and a pressure-gage, $g^2$.

N is a pipe leading from the base of the retort A into the cooler D, forming the cooler-coil U and discharging into the absorber F through the cold-liquor pipe T and the sprinkler W. This pipe is also provided with a valve, 3, near the retort, as shown in Fig. 1, and is used as the diluted or weak liquor pipe.

X is a cold-water supply-pipe, with a branch, $m$, for cooling the absorber F, and another branch, Y, for supplying the condenser C and cooler D with water. Z is also a water-pipe for supplying the cooler with water from the condenser. The cooling-chamber D has an overflow-pipe, $a$. The purge-pipe $b$ leads from the top of the absorber F into the tank H, and is provided with a cock, $b^2$, for opening and closing the pipe.

$e$ is a petcock for discharging the contents of the tank.

The absorber F is provided with a pressure-gage, $g^3$, above, and a glass gage, $c$, at the side, for showing the height of the liquor in the absorber.

The force-pump I has an inlet-pipe, $i$, which leads from the interior of the absorber through the water-jacket G to the pump, with a valve, 5, between them. The discharge-pipe $i'$ leads from the pump to the retort, with two check-valves, $f$ $f$, between the valves 2 and 4, as shown.

The operation of my improved absorber with the other apparatus is as follows, to wit: The retort A is filled about two-thirds full of aqua-ammonia. The absorber F is half filled with the same liquid. The retort is made strong enough to stand a high pressure, and steam being introduced through the pipe J into the heater B the ammonia in the retort is evaporated and passes out through pipe L into the coil M of condenser C, (the coil being immersed in cold water fed by branch pipe Y,) and the ammonia then liquefies, being under pressure. If the valve 6 be opened, the pressure being relieved the ammonia will begin to vaporize, and, passing out through the pipe V, fills the distributer O and the coils P of the refrigerator E, and, absorbing heat, reduces the surrounding temperature in the refrigerator. The gas then escapes into the collector Q, passes down through pipe R into the absorber-coil S, and is discharged into the liquor in the absorber near the suction-pipe *i*. The ammonia vapor passing through this absorber-coil cools it as it passes downward, and, uniting with the liquor close to the suction-pipe, is picked up by the pump before it can heat the liquor in the absorber, (as it parts with the heat it had absorbed very rapidly when it unites with the liquid in the absorber,) and is carried away to the retort, the flow of the liquid being regulated by the stop-valve 5. By this peculiar arrangement of passing the vapor through the coil S the absorber can be kept cool enough by the action of the ammonia vapor alone, as it is carried out of the absorber before it parts with enough of its heat to raise greatly the temperature of the liquor in the absorber. The weak liquor in the retort is forced, by means of the pressure generated in the retort A, from the bottom of the retort through the pipe N, coil U, and pipe T to and through the sprinkler W into the absorber upon the coil S, and the quantity may be regulated by the valve 3.

The cooler D is supplied with water, as before described, from the condenser C by means of the pipe Z. This water, having already been used in the condensation of the vaporized ammonia, is here further utilized to cool the weak liquor as it passes through the coils U, the pipe T, and sprinkler W into the absorber, reducing it to a temperature favorable to the absorption of the expanded vapor as it is discharged into the liquid in the absorber. The branch *m* of the cold-water pipe X discharges its water on the top plate of the absorber F, helping to cool it, and the water runs down its sides into the water-jacket G, from which it escapes by the overflow-pipe *d*.

In order to have full control in regulating the working of the apparatus, a pressure-gage, *g*, is conveniently placed on the retort A. Also, a gage, $g'$, is placed on the pipe V, near the regulating stop-valve 6. The gage $g^2$ is attached to the vapor-pipe R, and the gage $g^3$ is attached to the top of the absorber F.

The purge-pipe *b* and tank H are for the purpose of purging the apparatus of air. The pipe *b* conducts the air to near the bottom of the tank H, which is partly filled with water, and which by affinity absorbs any ammonia that may escape through the pipe *b* into the air. The petcock *e* is used to allow the air to escape from the tank.

~~I am aware that~~ prior to my invention ice-making apparatus have been used in various forms, and that retorts, condensers, coolers, and refrigerators have been used in these; but in none of them, I believe, has the expanded vapor been used to cool the liquor in the absorber by passing it through any chamber or coil, and I regard my method as an improvement upon the known methods of cooling the liquor in the absorber.

It is obvious that, instead of the coil S, a chamber might be used in connection with the absorber; but I prefer the coil, as shown.

What I claim, and desire to secure by Letters Patent, is as follows:

1. In a vapor-absorber for ammonia refrigerating apparatus, the absorber consisting of the metallic air and water tight case F, surrounded with the water-jacket G, and provided with the coil S, with suitable glass and pressure gages, the sprinkler W, the purge pipe and cock, and suction-pipe for a pump, substantially as shown and described.

2. The combination of the absorber F, the coil S, sprinkler W, pipe R, with its valve and pressure-gage, and the collector Q of the refrigerator, substantially as described.

3. In combination with the absorber F, the coil S, and sprinkler W, the pipe T, cooler D, with coil U, pipe N, stop-valve 3, and retort A, as and for the purpose specified.

4. In combination with the absorber F, coil S, and sprinkler W, the purge-pipe with stop-valve, and the tank with its discharge-cock, substantially as described.

5. In a vapor-absorber for ammonia refrigerators, the sprinkler W, located over the coil S, and the lower end of the coil discharging the gas in close proximity to the suction-pipe *i*, as and for the purpose specified.

6. The absorber F, with water-jacket G, in combination with the cold-water pipe *m*, substantially as described.

7. In an ammonia refrigerator, an absorbing-chamber so constructed and arranged that the weak liquor which takes up the expanded gas by uniting with it shall be cooled by the expanded vapor itself in its passage through any suitable chamber or coil.

In witness whereof I have hereunto set my hand this 7th day of April, 1882.

GEO. W. STOCKMAN.

Attest:
C. P. JACOBS,
SAMUEL STEPHENS.